(12) United States Patent
Dawson (10) Patent No.: US 9,290,833 B2
(45) Date of Patent: Mar. 22, 2016

(54) CONTROL OF STRUCTURAL PERFORMANCES IN LOAD-BEARING COMPONENTS BY MEANS OF STRENGTH-ALTERING, FRICTION STIR PROCESSED PATTERN

(75) Inventor: Paul R. Dawson, Ithaca, NY (US)

(73) Assignee: Cornell University, Ithaca, NY (US)

(*) Notice: Subject to any disclaimer, the term of this patent is extended or adjusted under 35 U.S.C. 154(b) by 0 days.

(21) Appl. No.: 13/695,148

(22) PCT Filed: Apr. 29, 2011

(86) PCT No.: PCT/US2011/034473
§ 371 (c)(1),
(2), (4) Date: Apr. 16, 2013

(87) PCT Pub. No.: WO2011/137300
PCT Pub. Date: Nov. 3, 2011

(65) Prior Publication Data
US 2013/0192727 A1 Aug. 1, 2013

Related U.S. Application Data

(60) Provisional application No. 61/343,496, filed on Apr. 30, 2010.

(51) Int. Cl.
C22F 1/00 (2006.01)
F16F 7/12 (2006.01)

(52) U.S. Cl.
CPC .... *C22F 1/00* (2013.01); *F16F 7/12* (2013.01)

(58) Field of Classification Search
CPC .......................................................... C22F 1/00
USPC ........................................................... 148/714
See application file for complete search history.

(56) References Cited

U.S. PATENT DOCUMENTS

| 5,914,163 A | 6/1999 | Browne |
| 2001/0006710 A1* | 7/2001 | Kawasaki et al. ............ 428/34.1 |
| 2002/0070074 A1 | 6/2002 | Bongiovi, Jr. |
| 2005/0110285 A1 | 5/2005 | Glasgow et al. |

OTHER PUBLICATIONS

International Search Report and Written Option for PCT International Application No. PCT/US2011/034473 Issued on Jan. 4, 2012.

* cited by examiner

*Primary Examiner* — Brian Walck
(74) *Attorney, Agent, or Firm* — Brown & Michaels, PC (57) ABSTRACT

A method of controlling the location at which yielding initiates a load bearing component and the collapse mode that is activated at the site of yielding for a designated type of loading is claimed. The steps include selecting a desired area of deformation and a kinematic mode of collapse; selecting a strength-altering pattern including at least a strengthening or weakening zone to control the location in a component where plastic deformation occurs, such that the pattern causes deformation to proceed into a desired collapse mode or shape with the component is subjected to design loading; and applying the strength-altering pattern to the component by friction stir processing, forming at least a strengthened or weakened zone relative to the base material of the component.

9 Claims, 6 Drawing Sheets

| Point | A | B | C | D | E |
|---|---|---|---|---|---|
| Load, kN | 70 | 140 | 160 | 140 | 120 |

Fig. 4

Sample 1     Sample 2

Sample 3

Fig. 5b

Sample 1

Fig. 6a

Sample 3

Fig. 6b

Sample 1

Fig. 7

CONTROL OF STRUCTURAL PERFORMANCES IN LOAD-BEARING COMPONENTS BY MEANS OF STRENGTH-ALTERING, FRICTION STIR PROCESSED PATTERN

REFERENCE TO RELATED APPLICATIONS

This application claims one or more inventions which were disclosed in U.S. Provisional Application No. 61/343,496, filed Apr. 30, 2010, entitled "CONTROL OF STRUCTURAL PERFORMANCES IN LOAD-BEARING COMPONENTS BY MEANS OF STRENGTH-ALTERING, FRICTION STIR PROCESSED PATTERNS". The benefit under 35 USC §119(e) of the United States provisional application is hereby claimed, and the aforementioned application is hereby incorporated herein by reference.

ACKNOWLEDGMENT OF GOVERNMENT SUPPORT

This invention was made with Government support under Sponsor's Project ID: N00014-09-1-0447, awarded by the DOD (NAVY-ONR). The government has certain rights in the invention.

BACKGROUND OF THE INVENTION

1. Field of the Invention

The invention pertains to the field of control of structural performance of load-bearing components. More particularly, the invention pertains to control of structural performance of load-bearing components through strength-altering, friction stir processed patterns.

2. Description of Related Art

Mechanical components in machines carry load in various modes, such as bending, torsional, and axial modes. It is customary in mechanical design to tailor the geometry of a component to best accommodate load, for example, by increasing a section of a beam in proportion to the bending moment so that stress is constant along the length of the beam. It is also possible to vary the material properties over the dimension of a component to achieve the performance required of the component.

An important design consideration for a variety of machines is the capacity to dissipate energy in the event of an impact. In this situation, it is desirable to have all the products of a given design perform in a highly repeatable manner. For example, energy-absorbing elements of a vehicle must deform the same way from vehicle to vehicle for there to be confidence that vehicles provide consistent crash-worthiness. Achieving this goal is more difficult under some loading modes than others.

When loads are carried in a compressive axial mode, a component is subject to buckling, making repeatability more difficult to achieve. In this case, the deformation behavior is strongly influenced by the location of small imperfections, unless some geometric feature is intentionally introduced in the design. Often, this is accomplished through the details of the part shape. However, intentionally altering the material's strength in some areas of a component can provide the same benefit.

SUMMARY OF THE INVENTION

A method of controlling the location at which yielding initiates a load bearing component and the collapse mode that is activated at the site of yielding for a designated type of loading is claimed. The steps include selecting a desired area of deformation and a kinematic mode of collapse; selecting a strength-altering pattern including at least a strengthening or weakening zone to control the location in a component where plastic deformation occurs, such that the pattern causes deformation to proceed into a desired collapse mode or shape with the component is subjected to design loading; and applying the strength-altering pattern to the component by friction stir processing, forming at least a strengthened or weakened zone relative to the base material of the component.

DETAILED DESCRIPTION OF THE INVENTION

Friction stir processing (FSP) is an existing, proven method for altering mechanical strength of metallic alloys, and is commonly used to modify the near-surface properties of metallic alloys. Friction stir processing specifically alters the microstructure of the material, changing microstructural attributes including the grain size, second-phase particle distribution, dislocation density and crystallographic texture. These attributes have a first-order effect on the strength, but only marginally influence the elastic moduli of the component or material.

Thus, friction stir processed patterns alter the strength of a component but does not appreciably change its stiffness. This offers the ability to modify a component's capacity to dissipate energy without altering other aspects of its performance that depend on stiffness rather than strength. Furthermore, depending on the alloy of the component and the processing conditions, the strength of the processed zone after friction stir processed patterns have been applied may be higher or lower than the base material of the component. The change to the base material of the component is repeatable.

In one embodiment of the present invention is a method that defines steps to locally alter the mechanical properties, according to the geometry of the component and the nature of the loading, in a way that affects the structural response so as to control the location at which plastic deformation initiates and prescribe how the deformation proceeds.

Figure 7:
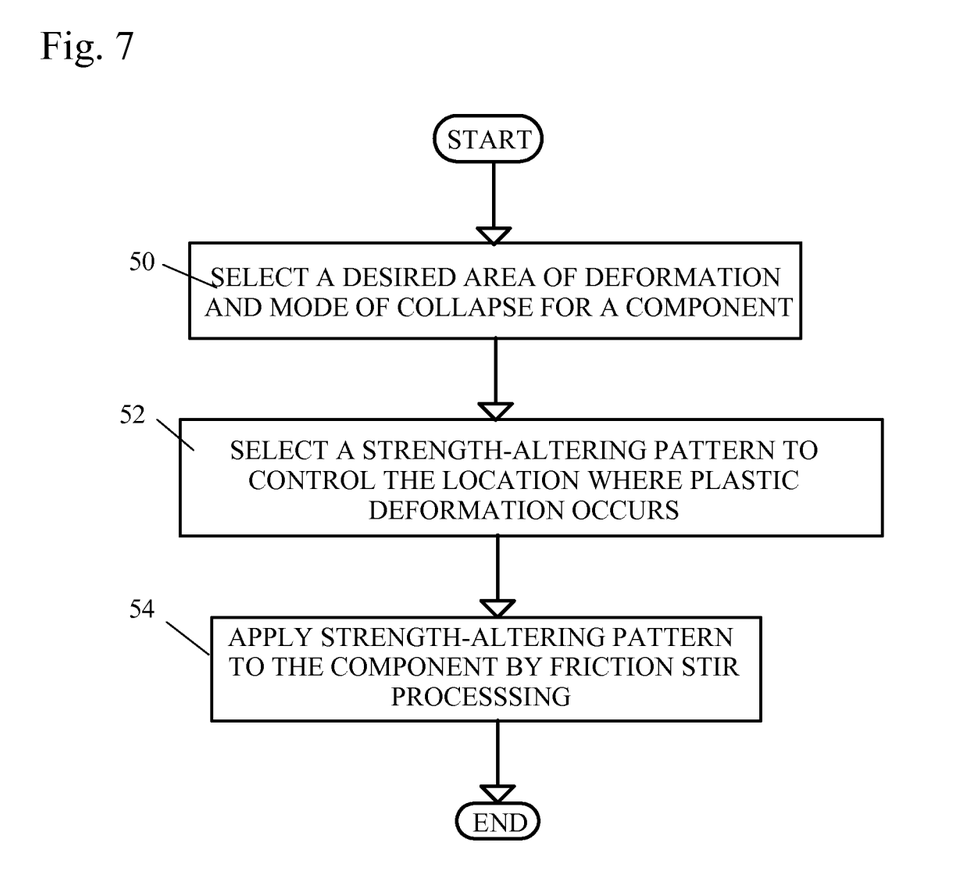
FIG. 7 shows a method of controlling structural performance in load-bearing components.

The steps include:

50) selecting a desired area of deformation and a kinematic mode of collapse;

52) selecting a strength-altering pattern including at least a strengthening or weakening zone to control the location in a component where plastic deformation occurs, such that the pattern causes deformation to proceed into a desired collapse mode or shape when the component is subjected to design loading; and 54) applying the strength-altering pattern to the component by friction stir processing, forming at least a strengthened or weakened zone relative to the base material of the component.

The zones are arranged in a strength-altering pattern that is designed to control the location that plastic deformation initiates in the component. By controlling the initiation and progression of plastic deformation, it is possible to direct the deformation of the component into a desired final shape. The strength-altering pattern depends on the component geometry, the alloy, and the loading on the component.

By recognizing in the layout of the patterns that the processed regions may act as strengthened or weakened zones relative to the base material, the direction of the deformation can be created or controlled. If two zones in a component carry the same stress, the zone that is weaker will yield and deform plastically first as the intensity of the loading increases on the component. The relative strengths of two zones within the component are changed via friction stir processing one of the zones. Thus, a user can pre-select where plastic flow begins by judiciously adjusting the spatial distribution of strength in a pattern introduced by friction stir processing. In thin-walled components, the patterns are imposed that cause folding of the walls at a chosen position along the length. Further, the pattern biases the deformation to one side.

The placement of the friction stir processing zones is governed by two principles. The first is that yielding (the transition from an elastic, recoverable deformation to elastic-plastic deformation that is not fully recoverable upon removal of the load) occurs in the weaker of two materials or samples subjected to the same stress. The second is that when a material is undergoing a ductile plastic deformation it will follow the path that requires the least power at each step along the path (according to the principle of virtual power). Thus, among the possible deformed shapes, the one that occurs is the one that requires the least power step-by-step.

The design objective in placing the FSP zones is to first create a zone of relatively weaker material where one wants the deformation to initiate as the load increases (according to the first principle) and, second, to have the desired deformed shape correspond to the path of least power (according to the second principle).

The first step is accomplished by examining the load bearing cross section. The FSP pattern is placed to ensure that stress at the initiation sites reach the strength before other areas. Thus, plastic flow can begin in zones designated by the designer.

The second step is accomplished by examining possible compatible modes of deformation, of which there commonly are many. For instance, it is possible for a column to shorten while remaining straight or by bending. Forming a sharp bend, or plastic hinge, localizes the deformation in comparison to an overall shortening. The two modes both accomplish shortening, but require different power levels dependent on the geometry of the column and the work hardening properties of the material. Numerical modeling can be used to compute the dissipative rates for different modes and to identify which mode is more likely to occur.

In the examples, the patterns have two elements to the design. The features labeled 4a in FIGS. 1, 2 and 4 accomplish the first step of creating two cross sections of reduced strength in comparison to the rest of the tube. As the stress in these zones will be approximately the same on loading as the rest of the tube, but the strength will be lower, plastic flow can initiate along the length of the zones created by the FSP pattern. The features labeled 4b are intended to accomplish the second step by enabling the region between the upper and lower portions of 4a to bulge laterally. The desired mode is to form folds along 4a and bulges between the folds. This allows the entire tube to collapse by lateral displacement of the center relative to the ends toward the left.

Figure 2:
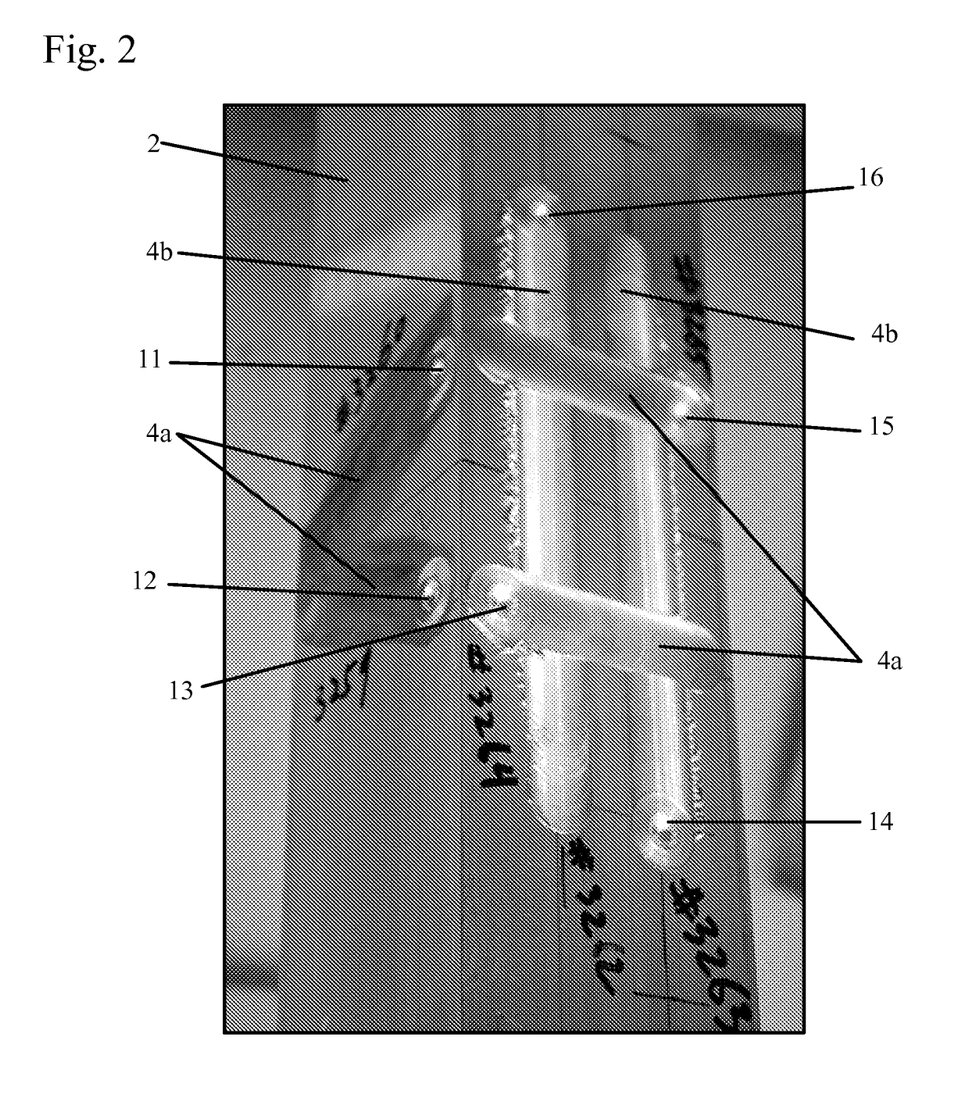
FIG. 2 shows a tube with friction stir processed pattern prior to prior to application of a compressive force.

The initial pattern shown in FIG. 2 developed an asymmetric pattern with respect to the upper and lower portions of 4a. The deformation favored localized bending/bulging around the upper FSP zone rather than forming a fold at both the upper and lower FSP zones with more diffuse bulging between them. Sample 3 in the demonstration has additional treatment of the region between the upper and lower zones of 4a to further reduce the overall strength in a way that requires less power to create a diffuse bulge. With this modification, the symmetric mode was active as it required less power to activate. This is verified in FIG. 3 in which the force for Sample 3 is lower than for Samples 1 and 2 once the collapse mode is activated.

The same strategy is used for FSP that increases the strength over the base material, except that the processed zones require higher stress to yield and thus create zones that are not the first to yield. The first step of the design is to create a pattern in which the load bearing cross section where deformation is desired is free of strengthened regions. Again, the deformation mode that is activated is the one requiring the least power to drive, which may be determined by computing the dissipation rate associated with possible modes.

Figure 8A:
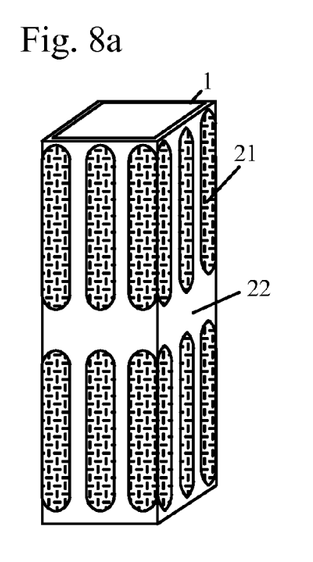
FIGS. 8a-8c show patterns of strengthened FSP zones along a portion of a component.
Figure 8B:
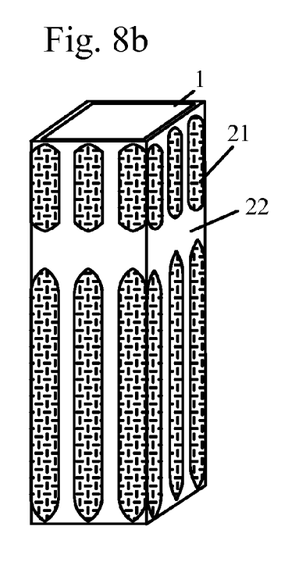
Figure 8C:
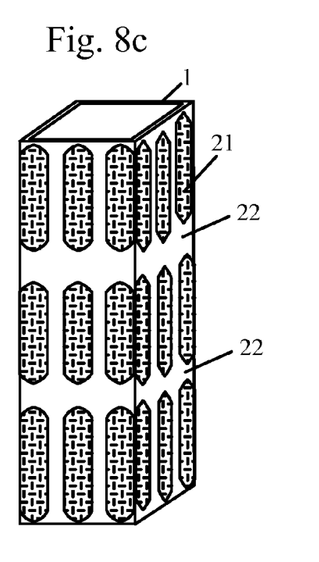

A set of patterns are shown in FIGS. 8a-8c that leave relatively weaker cross sections 22 in designated zones along the length of the component 1. Strengthened zones 21 imparted by FSP are laid out to inhibit undesired modes, and by default, enable the desired mode. The zones with FSP 21 enhance the strength and assure that yielding begins in the processed zones. In FIG. 8a, the weaker zone 22 is centered on the part 1, in FIG. 8b the weaker zone 22 is near the top and in FIG. 8c there are two weaker zones 22 near the bottom and top of the component 1.

The size of the processed zone depends on the tool geometry, the depth it penetrates into the material, and the distance it traverses along the part surface. Tooling exists that allows these parameters to be prescribed to enable emplacement of patterns adapted specifically for the geometry and loading of a particular component.

Figure 1:
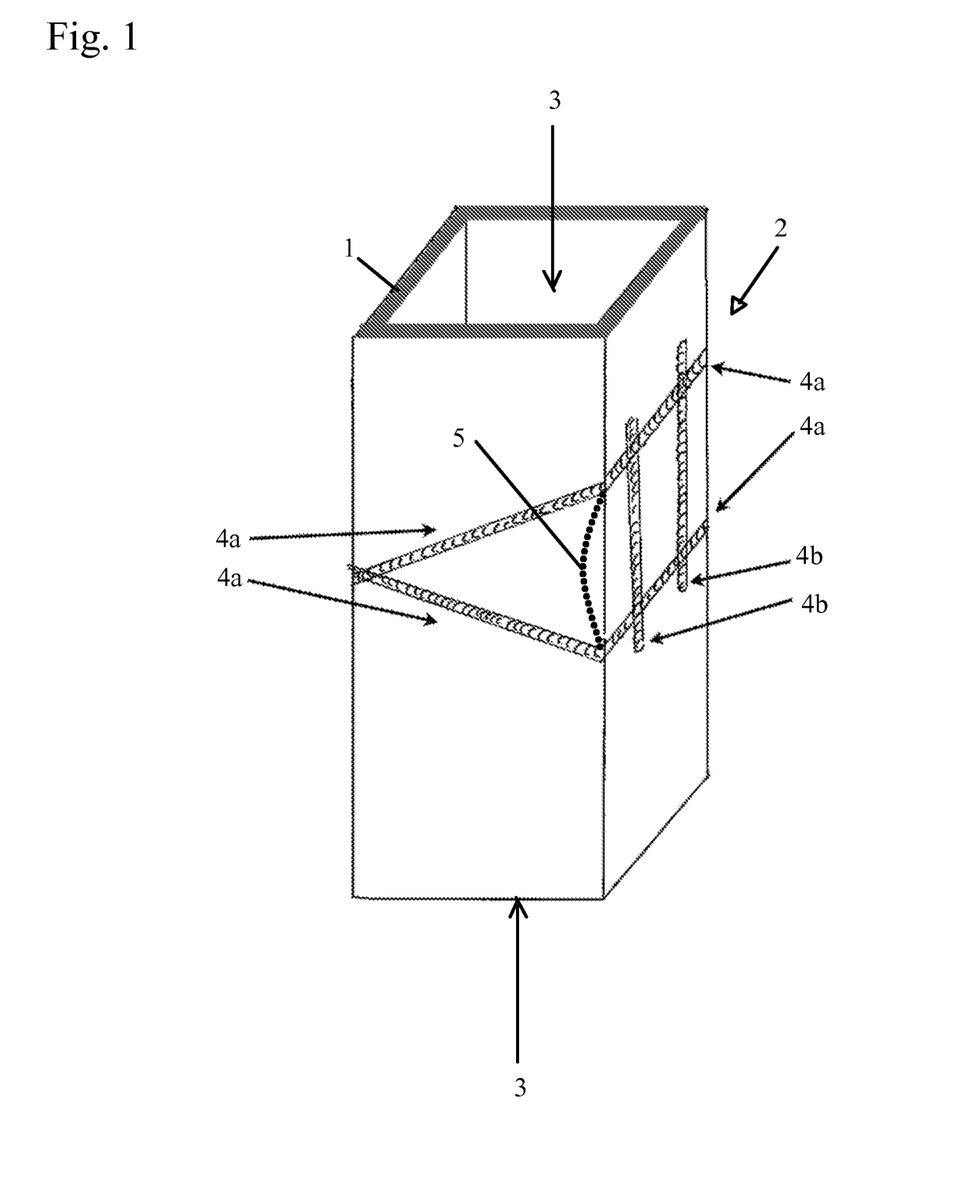
FIG. 1 shows a friction stir processed pattern on a square cross sectioned tube.

An example of a strength-altering friction stir processed pattern 2 with zones 4 on a thin-walled tube of square cross section is shown in FIG. 1. Under compressive load 3 applied along the tube axis, the friction stir processed zones create a bellows type of deformation. This directs the collapse toward one side, concave outward to the left, as shown by dotted line 5.

Example 1

A strength-altering pattern was placed on two samples, Sample 1 and Sample 2, of square aluminum tubing (6061-T6) to impart a pre-selected position along the tube for plastic deformation to concentrate. The tubes each had a 7.62 cm×7.62 cm (3" by 3") cross section with 3.175 mm (0.125") wall thickness. The samples were painted with a speckle pattern prior to testing to facilitate measurements of the deformation.

The strength-altering friction stir pattern was selected and designed to control the direction of deformation by weakening one side over an extended zone in comparison to the opposing side and by providing deformation channels on the other sides that promote folding. FIG. 2 shows one of the tubes, prior to loading, in which the FSP pattern 2 of zones 4a, 4b is evident. Note that at the end of each FSP path a small pin mark can be seen, denoted in FIG. 2 by reference numbers 11-16.

Samples 1 and 2 were loaded in compression using a servo-hydraulic load frame. The ends of the samples fit into machined recesses of a custom-made fixture to constrain the samples against lateral movement at their ends. The crosshead of the load frame was advanced at constant velocity until a total axial deformation of 1.5 cm was achieved. Over the course of the compression, the loads increased, peaked and then decreased, as shown in FIG. 3.

Figure 3:
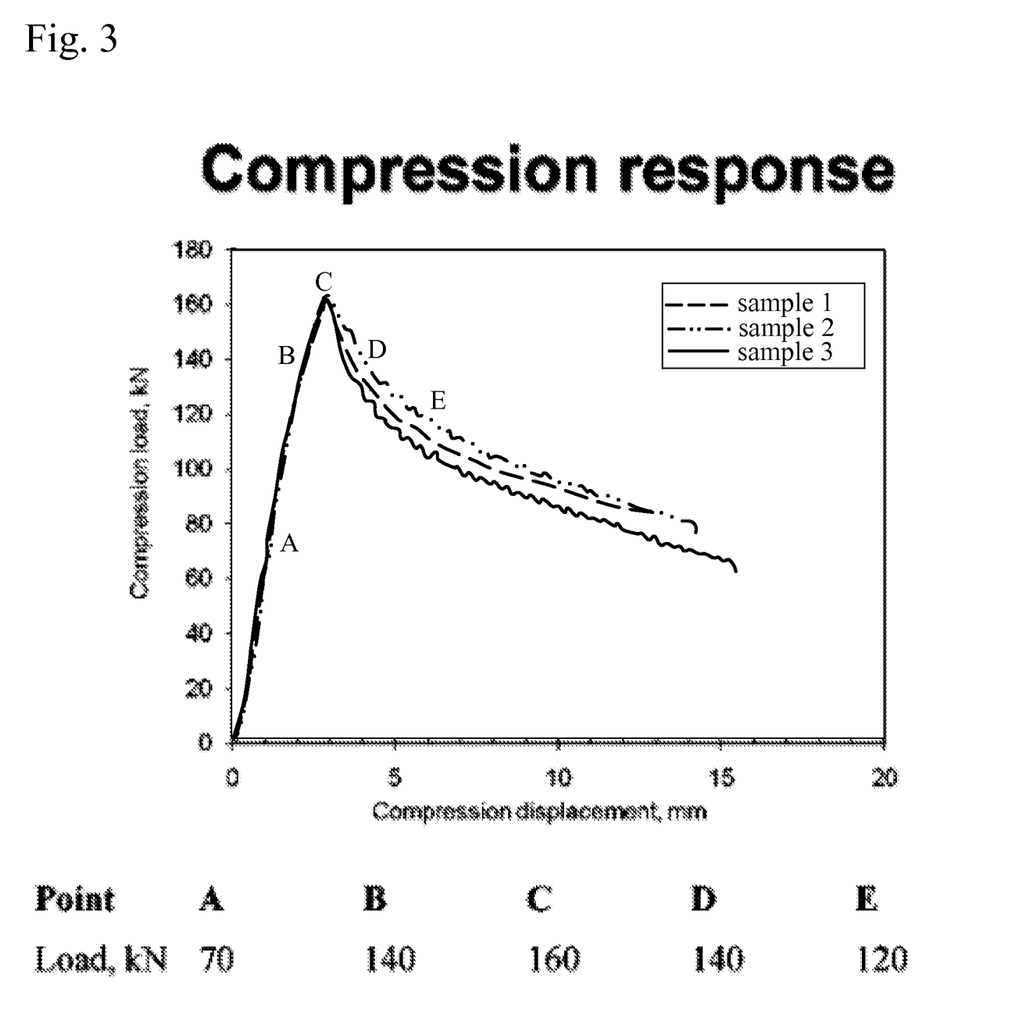
FIG. 3 shows a graph of compression load versus compression displacement of samples during testing.

Referring to FIG. 3, a graph of compression load versus compression displacement, the load-displacement records are nearly identical as the load rises from Point A to Point C for samples 1 and 2 (see dashed line for Sample 1 and dash-dot-dot line for Sample 2). After reaching a peak load at Point C, the unloading records for both samples are quite similar, ending at equal final loads.

Figure 4:
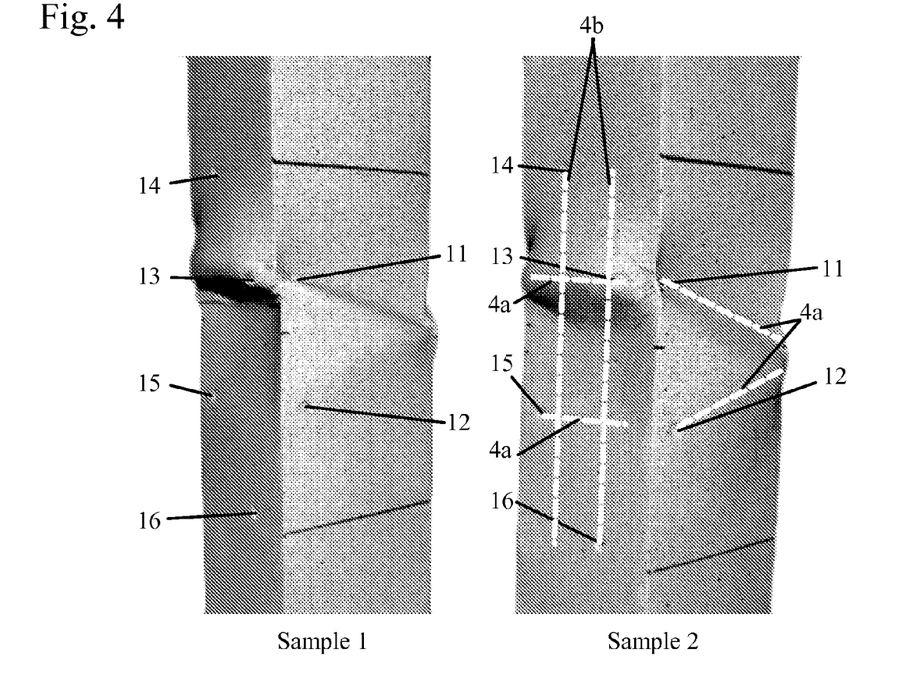
FIG. 4 shows samples 1 and 2 subsequent to loading.

Samples 1 and 2 are shown after testing in FIG. 4. Although the samples were painted before testing, the pin marks 11-16 showing the FSP path ends can still be seen in the figure. The photograph of sample 2 was annotated with white dashed lines to show the zones 4a, 4b.

The deformed shapes of samples 1 and 2 show the same patterns in terms of bulging or folding inward in some regions and outward in others. The deformations occurred in precisely the same locations relative to the friction stir patterns, indicating that the weakened regions emplaced on the tubes by the friction stir processing controlled the location of the deformation as planned. There is an overall curvature to the tubes not apparent in FIG. 4 that is the same in both samples.

Example 2

Figure 5A:
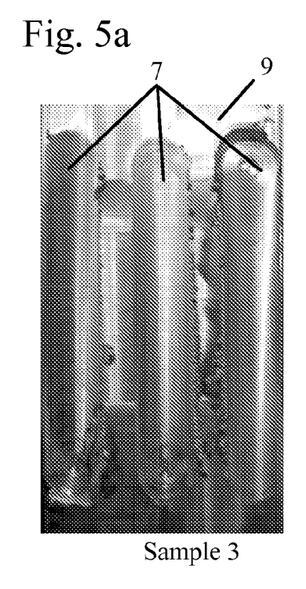
FIG. 5a shows a modified friction stir pattern corresponding to sample 3.
Figure 5B:
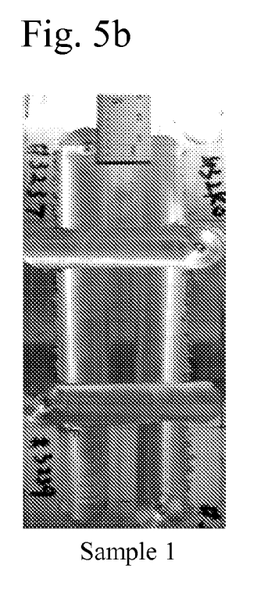
FIG. 5b shows an original friction stir pattern corresponding to sample 1.

To demonstrate that details of the emplaced patterns would be important in the outcome and thus give the capability to deliberately control the deformation process, the strength-altering pattern 9 in sample 2 was modified by adding three additional bands 7 to the original strength-altering pattern on one side only prior to loading as shown in FIG. 5a. The sample 1 pattern is shown in FIG. 5b prior to loading.

The strength-altering pattern was placed on two samples, sample 1 and sample 3 of square aluminum tubing (6061-T6) to impart a pre-selected position along the tube for plastic deformation to concentrate. The tubes each had a 7.62 cm×7.62 cm (3" by 3") cross section with 3.175 mm (0.125") wall thickness. The samples were painted with a speckle pattern prior to testing to facilitate measurements of the deformation.

Samples 1 and 3 were loaded in compression using a servo-hydraulic load frame. The ends of the samples fit into machined recesses of a custom-made fixture to constrain the samples against lateral movement at their ends. The crosshead of the load frame was advanced at constant velocity until a total axial deformation of 1.5 cm was achieved. Over the course of the compression, the loads increased, peaked and then decreased, as shown in FIG. 3. The load displacement record for sample 3 is shown in FIG. 3 by the solid line.

Referring to FIG. 3, the response up to the peak load of sample 3 is the same as samples 1 and 2, indicating that the elastic response is unaffected by the emplacement of the pattern 9. The unloading record, subsequent to Point C, is similar to that of samples 1 and 2, but shows that the load required to continue deforming sample 3 is somewhat lower than that required for samples 1 and 2.

Figure 6A:
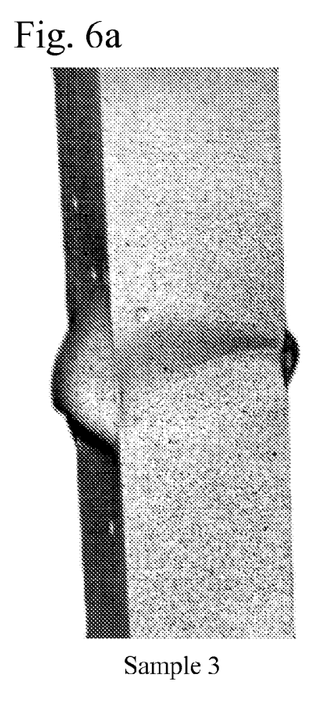
FIG. 6a shows a modified tube (sample 3) with a modified friction stir pattern corresponding to FIG. 5a following testing.
Figure 6B:
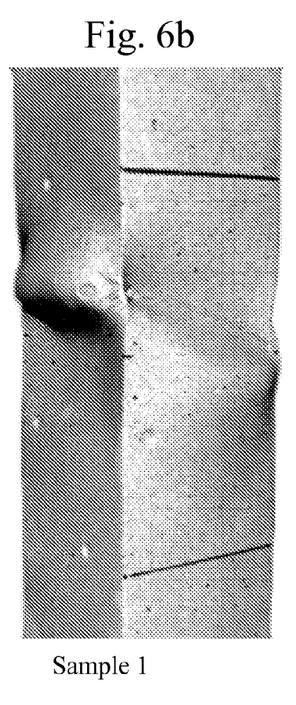
FIG. 6b shows an original tube (sample 1) with an original friction stir pattern corresponding to FIG. 5b following testing.

Samples 3 and 1 are shown in FIGS. 6a and 6b respectively after testing. The deformed shapes of samples 1 and 2 show different patterns in terms of bulging or folding inward in some regions and outwards in others. By altering the pattern applied by FSP, the deformation or bulge of sample 3 takes place lower than the deformation of sample 1.

Examples 1 and 2 show that the method of locally altering the mechanical properties, according to the geometry of the component and the nature of the loading, using FSP can direct the deformation into a designated region of the component and the deformations are reproducible or repeatable with another component processed in the same way. Further, by modifying the pattern, for example in comparing Example 1 to Example 2, varying the pattern applied by FSP is capable of providing direction to the deformation mode and has little if any effect on elastic loading of the component.

Therefore, the method of an embodiment of the present invention, controls the physical location of a plastic zone within a structural component by means of the emplacement of a strength-altering FSP pattern consisting of at least a strengthening or weakening zone relative to the base material of the component. The method of an embodiment of the present invention also controls the mode of deformation, specifically the deformed shape of the component, by emplacement of a strength-altering FSP pattern on the component. The control of a component's strength is independent of its structural stiffness by the emplacement of a strength-altering FSP pattern. Also, a method of an embodiment of the present invention allows a user to increase or decrease the relative strength of one region of a component relative to another region by the emplacement a strength-altering FSP pattern over a portion of the component.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of designating a target location and deformation geometry in which a load bearing component deforms under a load, comprising:
   a) designating a target location in the load bearing component where plastic collapse deformation is to occur under the load;
   b) inducing a kinematic mode of collapse of the load bearing component at the target location by the steps of:
      i) designating a strength-altering pattern including at least a strengthening or weakening zone to be applied at a processed zone along a length of the load bearing component to cause the load bearing component to undergo plastic collapse deformation at the target location along the length of the load bearing component when the load bearing component is subjected to the load; and
      ii) forming at least one strengthening or weakening zone along the length of the load bearing component, altering the strength of the load bearing component at the strengthening or weakening zone relative to the base material of the load bearing component by performing friction stir processing at the processed zone in the strength-altering pattern designated in step (b)(i).

2. The method of claim 1 in which the strength-altering pattern is designated in step (b)(i) based upon component geometry, alloy, and the load on the load bearing component at which deformation is to occur.

3. The method of claim 1 in which the load bearing component comprises a first side, an opposing side opposite the first side, and a plurality of other sides, and the strength-altering pattern is designated in step (b)(i) to control the direction of deformation by weakening the first side of the load bearing component over an extended zone in comparison to the opposing side and by providing deformation channels on the plurality of other sides such that the load bearing component under the load is deformed on the first side and folded on the plurality of other sides.

4. The method of claim 1, in which a size of the processed zone is determined by a geometry of a tool used to create the zone, a depth of penetration of the tool into the load bearing component, and a distance the tool traverses along the load bearing component.

5. The method of claim 1, in which the load bearing component has a plurality of walls and a length, and the strength-altering pattern is applied to the plurality of walls, so that when the load bearing component is under the load, the plurality of walls undergoes plastic collapse deformation at a position along the length.

6. The method of claim 5, in which the strength-altering pattern biases the deformation of the load bearing component to one side.

7. The method of claim 1, in which the step (b)(i) of designating a strength-altering pattern comprises:
   a) creating a zone of relatively weaker material where deformation is to initiate as the load increases; and
   b) designating a deformed shape of the load bearing component to correspond to a path of least power.

8. The method of claim 7, in which the step (a) of creating a zone comprises:
   i) examining a load bearing cross section of the load bearing component; and
   ii) placing the strength-altering pattern to ensure that stress at the zone where deformation is to initiate reaches a design strength before other areas, such that plastic flow begins in designated zones.

9. The method of claim 7 in which the step (b) of selecting the deformed shape comprises:
   i) examining possible compatible modes of deformation;
   ii) computing dissipative rates for different modes through numerical modeling, to identify which mode will occur.

* * * * *